United States Patent [19]

Czarnocki

[11] Patent Number: 4,550,611

[45] Date of Patent: Nov. 5, 1985

[54] ELECTRONIC PRESSURE TRANSDUCER

[75] Inventor: Wlodzimierz S. Czarnocki, Hoffman Estates, Ill.

[73] Assignee: Motorola, Inc., Schaumburg, Ill.

[21] Appl. No.: 568,551

[22] Filed: Jan. 5, 1984

[51] Int. Cl.⁴ ............................................. G01L 19/04
[52] U.S. Cl. ...................................... 73/708; 73/718; 73/724
[58] Field of Search ................. 73/708, 766, 765, 718, 73/724; 361/283; 307/254

[56] References Cited

U.S. PATENT DOCUMENTS

| | | | |
|---|---|---|---|
| 3,841,150 | 10/1974 | Pearson | 73/88.5 R |
| 3,970,966 | 7/1976 | Keller et al. | 331/116 R |
| 4,165,653 | 8/1979 | Morehouse | 73/722 |
| 4,176,557 | 12/1979 | Johnston | 73/208 |
| 4,202,218 | 5/1980 | Romo | 73/766 |
| 4,227,419 | 10/1980 | Park | 73/724 |
| 4,250,452 | 2/1981 | Gray | 328/1 |
| 4,289,035 | 9/1981 | Lee | 73/708 |
| 4,392,382 | 7/1983 | Myers | 73/708 |

FOREIGN PATENT DOCUMENTS 52-40184  3/1977  Japan .

OTHER PUBLICATIONS

Motorola Schematic 63C44378F01.
Motorola Data Book Aug., 1973, pp. 65–68, on MC12000.
Handbook of Microcircuit Design Applications, by David Stout, page covering D Flip Flop Synchronized One Shot.

Primary Examiner—Donald O. Woodiel
Attorney, Agent, or Firm—Phillip H. Melamed

[57] ABSTRACT

An electronic pressure transducer for providing a pressure-indicative analog output signal includes a capacitive pressure sensing oscillator having a frequency dependent on an applied pressure. A combining circuit combines the oscillator signal with a constant frequency signal generated by a reference oscillator to generate a difference signal having a duty cycle dependent on the frequency difference between the oscillator signals. The difference signal is applied to an integrating circuit and amplified by a variable-gain output amplifier to develop the pressure-indicative analog output signal. A pair of D-type flip-flops and an EXCLUSIVE OR logic gate in the combining circuit enable the combining circuit to function with oscillator frequency ratios of 1:1 to 2:1, thereby enabling the capacitive pressure sensing element of the pressure sensing oscillator to operate over a wider range of sensitivities. Non-linearities at the output of the integrating circuit are compensated for by a linearizing transistor having main electrodes coupled to a degenerative feedback network in the output amplifier. A second transistor having main electrodes coupled to the control electrode of the linearizing transistor compensates for temperature variations in the conduction level of the linearizing transistor.

27 Claims, 7 Drawing Figures

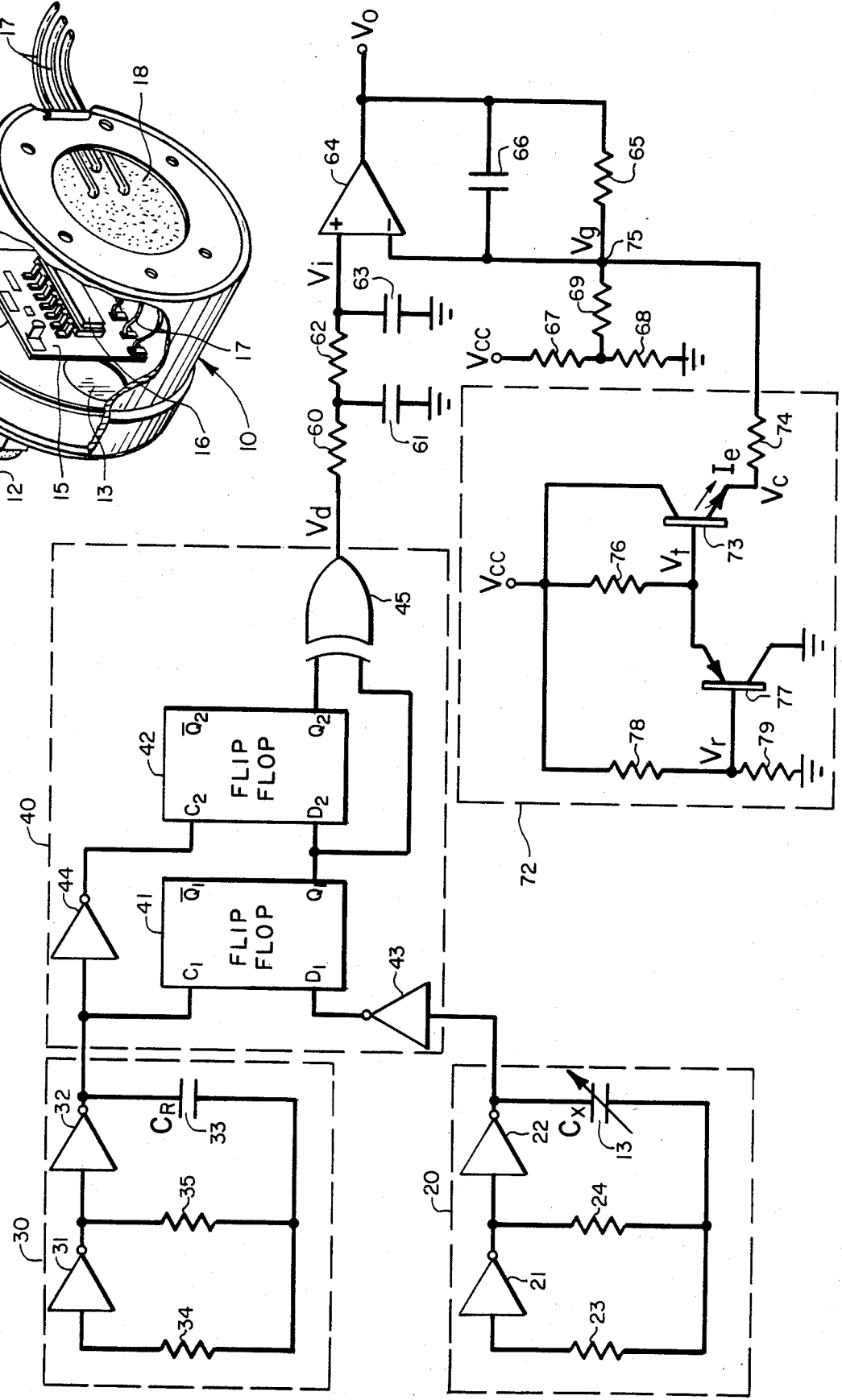

ELECTRONIC PRESSURE TRANSDUCER

BACKGROUND OF THE INVENTION

The present invention is directed generally to electronic pressure transducers, and more particularly to temperature-compensated capacitive pressure transducers having a high degree of linearity.

Electronic capacitive pressure transducers are utilized in a wide range of applications for providing an electrical output signal indicative of a sensed pressure level. Typically, such transducers utilize a pressure sensor element, such as described in U.S. Pat. Nos. 4,178,621 to Simonelic et al., 4,204,244 to Ho and 4,225,632 to Ho, all assigned to the same assignee as the present invention. In these elements the spacing between two spaced-apart capacitor plates is changed with applied pressure, causing a change in the electrical capacitance of the element. An associated processing circuit such as described in U.S. Pat. Nos. 4,250,452 to Gray et al. and 4,392,382 to Myers, which are also assigned to the present assignee, generates an output signal, typically in analog form, from the change in electrical capacitance.

With the advent of computer controlled combustion engines, pressure transducers have come into use for sensing engine manifold pressure, and for providing a signal indicative of the sensed pressure to an engine control computer. Because of the wide temperature and pressure ranges encountered in such engine control environments, and the necessity of restricting the output signal to a relatively narrow range compatible with the computer, it is necessary that the processing circuitry incorporated in pressure transducers utilized in engine control applications have a high degree of linearity, and be substantially unaffected by extreme temperature changes in the operating environment. Furthermore, it is desirable that such transducers be capable of economical high volume production so as to not unnecessarily increase the cost of the engine control system. In particular, because of variations in sensitivity brought about by manufacturing tolerances encountered in capacitive pressure sensing elements, it is desirable that the processing circuitry of pressure transducers in engine control applications be capable of accommodating a wide range of pressure sensor sensitivities.

The present invention is directed to an electronic pressure transducer which provides improved linearity and temperature independence, and which accommodates a wide range of pressure sensing element sensitivities.

SUMMARY OF THE INVENTION

In one embodiment of the present invention, a linearized electronic pressure transducer is provided for providing an output signal indicative of an applied pressure. The transducer includes a reference oscillator providing a reference signal having a frequency independent of the applied pressure, and a sensor oscillator providing a pressure signal having a frequency dependent on the applied pressure. Combining means provide a difference signal having a duty cycle related to the frequency difference between the reference signal and the pressure signal over a relative frequency range of 2:1 to 1:1. Integrating circuit means responsive to the duty cycle provide the pressure-indicative output signal.

Preferably, the combining means comprise first and second flip-flop logic elements and a combining logic element having first and second inputs. The first flip-flop is conditioned to one state by the reference oscillator signal, and to its other state by the sensor oscillator signal. The second flip-flop is conditioned to one state by the reference oscillator signal in alternation with the first flip-flop, and to its other state by the first flip-flop. The first input of the combining logic element is connected to the output of the first flip-flop, and the second input of the combining logic element is connected to the output of the second flip-flop.

In another embodiment of the present invention, a linearized temperature-compensated electronic pressure transducer is provided for providing a pressure-indicative output signal indicative of an applied pressure. Pressure sensing circuit means provide an analog pressure signal having a magnitude varying as a predetermined function of sensed pressure, the pressure signal having an undesirable non-linear variation relative to sensed pressure. Output circuit means coupled to the pressure sensing means and responsive to the analog signal produce an analog output signal, the output circuit means having a transfer characteristic dependent upon an applied control signal. Compensating circuit means responsive to the output signal vary the transfer characteristic of the circuit means to compensate for the non-linear characteristic in the pressure signal whereby the output signal is linearly indicative of the applied pressure.

Preferably, in the linearized electronic pressure transducer the output circuit comprises an amplifier having a degenerative feedback circuit, and the compensating circuit means comprise a transistor having principal electrodes connected between the feedback circuit and a plane of reference potential. Where the linearizing transistor is subject to variations in conduction level with changes in temperature, the linearity compensating circuit means preferably include temperature compensating means coupled to the control electrode of the transistor for applying a control signal to the transistor to maintain the conduction level thereof constant with variations in temperature. Preferably, the temperature compensating means comprise a transistor having principal electrodes connected between the control electrode of the linearity compensating transistor and a plane of reference potential. Furthermore, the linearity compensating transistor is preferably of one gender, and the temperature compensating transistor is of the opposite gender.

Through the use of the above structure, it has been found that a capacitive electronic pressure transducer can be constructed which has an analog output signal that varies substantially linearly as a function of sensed pressure over extreme ranges of temperature and pressure, and which accommodates a wide range of capacitive pressure sensing elements. This has been accomplished by the use of a minimum number of circuit elements and at a relatively inexpensive cost.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 1 is a perspective view of an electronic pressure transducer constructed in accordance with the invention partially broken away to show the interior of the transducer.

FIG. 2 is a simplified schematic diagram of a pressure transducer constructed in accordance with the invention.

DESCRIPTION OF THE PREFERRED EMBODIMENT

Figure 3:
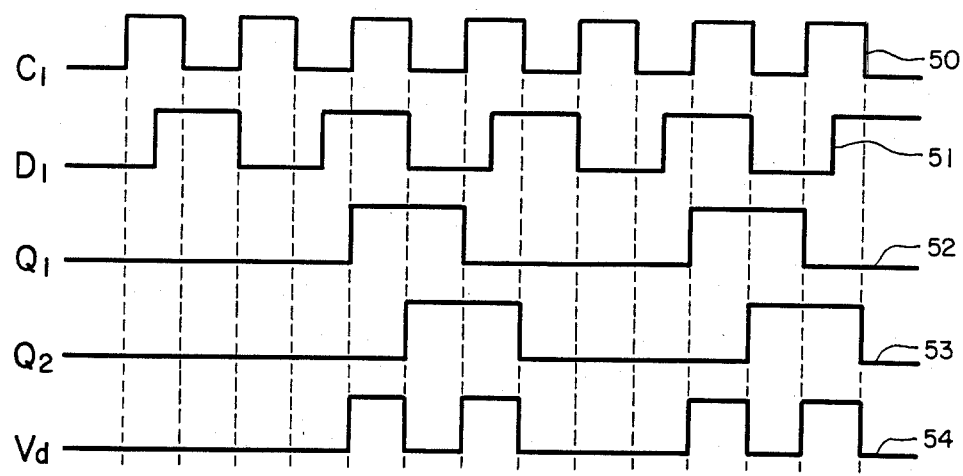
FIG. 3 is depiction of certain waveforms useful in understanding the operation of the pressure transducer circuit of FIG. 2.

Referring to the Figures, and particularly to FIG. 1, an electronic capacitive pressure transducer 10 incorporating a processing circuit constructed in accordance with the present invention is seen to include a generally cylindrical housing 11 including at one end a threaded fitting 12 for connection to a source of monitored pressure, such as the manifold of an internal combustion engine. Within the housing a variable capacitance pressure sensing element 13, which may be conventional in construction and operation, is mounted in pressure communication with pressure fitting 12. The sensing element is connected by a plurality of electrical conductors 14 to processing circuitry contained on a printed wiring board 15. In accordance with conventional practice, a portion of the processing circuitry may be contained within an integrated circuit 16 mounted to the circuit board. Connections to related system components, such as an engine control computer, may be established by means of a plurality of electrical conductors 17 extending from circuit board 15 through the opposite end of housing 11. A layer 18 of epoxy may be provided within housing 11 to seal the internal circuitry against oil and other contaminants in the operating environment.

Referring to FIG. 2, the processing circuitry contained within the pressure transducer 10 includes a sensor oscillator 20 which utilizes the variable capacitance pressure sensor 13 ($C_x$) to provide an output signal which varies in frequency with changes in the sensed pressure. The sensor oscillator 20 may employ various known circuits to produce an output frequency in accordance with the magnitude of the variable capacitance provided by the pressure sensor 13. In the present conventional embodiment the oscillator includes a pair of inverter amplifiers 21 and 22 in combination with a feedback network comprising pressure sensing capacitor 13 and a pair of resistors 23 and 24. Thus connected, capacitor 13 functions to control the effective frequency of the feedback network, and hence the operating frequency of the oscillator.

The transducer processing circuit also includes a reference oscillator 30 which provides a fixed frequency output signal. Oscillator 30, which, like oscillator 20, may be conventional in construction and operation, comprises in the present embodiment a pair of inverter amplifiers 31 and 32, in combination with a feedback network comprising a reference capacitor 33 ($C_r$) and a pair of resistors 34 and 35. With this arrangement, the reference oscillator produces an output signal at a frequency dependent on the reference capacitor 33. The output signals from oscillators 20 and 30 are applied to a combining circuit 40 which provides an output signal having a variable duty cycle related to the difference between the frequencies of the two oscillator signals. The two oscillators preferably have identical temperature coefficients to obviate the effect of temperature changes on the transducer output signal.

Various combining circuits have been used in pressure transducers for providing a variable duty cycle output signal related to the frequency difference between two applied signals. For example, one such circuit is shown in the aforementioned U.S. Pat. No. 4,250,452 to Gray et al. In that patent the variable duty cycle signal is integrated and the integrated signal is used as a closed loop control feedback signal to maintain the duty cycle at substantially 50%, thereby providing a feedback voltage related to the difference between applied frequencies. Another circuit is embodied in an integrated circuit SCCF 74116 manufactured by Motorola, Inc., the assignee of the present invention. Another pressure transducer combining circuit is shown in the aforementioned U.S. Pat. No. 4,392,382, wherein two D-type flip-flops are connected to provide a variable duty cycle signal as the applied oscillator signals vary over a frequency ratio of 2:1 to 1.5:1. This circuit has been manufactured in integrated circuit form and has found wide commercial acceptance.

Combining circuit 40, in accordance with one aspect of the present invention, differs from the aforementioned pressure transducer combining circuits in that it is operative over a frequency ratio between reference and sensed signals of 2:1 to 1:1, and thereby allows for a greater range of sensitivities in the pressure sensing capacitor 13. As shown in FIG. 2, combining circuit 40 includes a pair of D-type flip-flops 41 and 42. The output of the pressure sensor oscillator 20 is applied through an inverter 43 to the data (D) input of flip-flop 41. The output of the reference oscillator 30 is applied directly to the clock (C) input of flip-flop 41, and through an inverter 44 to the clock (C) input of flip-flop 42. The non-inverted Q output of flip-flop 41 is connected directly to the data (D) input of flip-flop 42, and to one input of an EXCLUSIVE OR gate 45. The non-inverted Q output of flip-flop 42 is connected to the remaining input of EXCLUSIVE OR gate 45.

With the above connections, combining circuit 40 receives oscillator output signals from oscillators 20 and 30 and provides a resultant variable duty cycle signal Vd at the output of EXCLUSIVE OR gate 45. This operation is illustrated in FIG. 3 wherein a waveform 50 represent the constant frequency output signal of oscillator 30 as applied to the clock input of flip-flop 42, and a waveform 51 illustrates the pressure dependent variable frequency output signal of oscillator 20 as applied to the data input of flip-flop 41. As a consequence of the simultaneously applied signals, flip-flop 41 is caused to change state in accordance with the frequency difference between the signals. This is illustrated by waveform 52, which represents the non-inverted Q output of flip-flop 41. Flip-flop 42 is also caused to change state in accordance with the frequency difference between the two oscillator signals, but at a phase difference relative to flip-flop 41. This is illustrated by waveform 53, which represents the non-inverted Q output of flip-flop 42. The phase-displaced outputs of flip-flops 41 and 42 are combined by EXCLUSIVE OR gate 45 to obtain an output signal wherein the duty cycle varies as a function of the relative frequencies of the reference and sensor oscillators between a ratio of 2:1 and 1:1, as shown by waveform 54.

Figure 4:
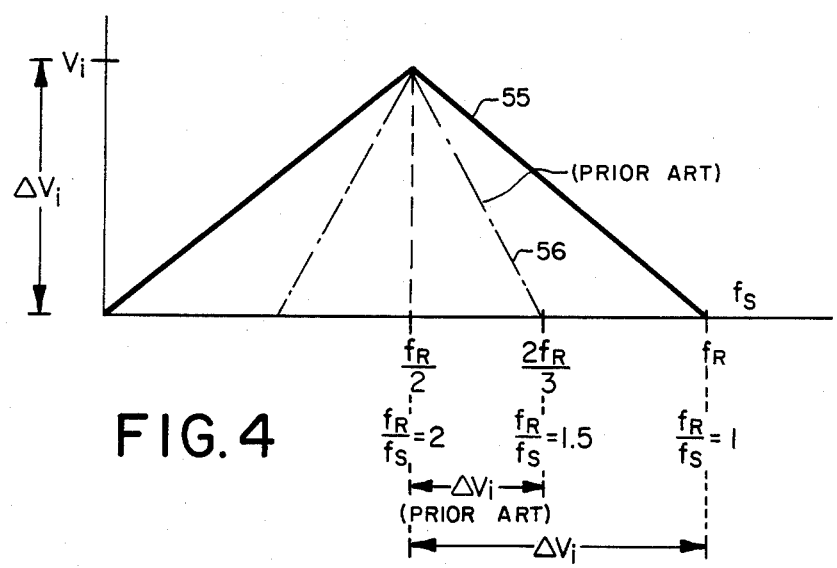
FIG. 4 is a plot of combining circuit output voltage versus oscillator frequency illustrating the operation of the combining circuit utilized in the pressure transducer.

As illustrated in FIG. 3, the construction of combiner 40 enables a duty cycle change in combiner output voltage $V_d$ to be obtained from the combiner circuit over a range of reference frequency to sensor frequency ratios of 2:1 to 1:1, instead of over the limited range of 2:1 to 1.5:1 of prior pressure transducer combiner circuits. This is illustrated in FIG. 4 by the plot 55 of the integral $V_i$ of the output voltage $V_d$ versus reference to sensor frequency ratio. In contrast, in prior combining circuits, such as illustrated in the aforementioned U.S. Pat. No. 4,392,382, an output voltage $V_i$ was obtained over a reduced range extending between a frequency ratio of 2:1 to 1.5:1, as shown by plot 56. Consequently, in such prior transducers the pressure sensor oscillator was restricted to a narrower operating range relative to the fixed frequency reference oscillator. In practice, this required that the sensitivity of the pressure sensing capacitor element, expressed as the percentage change of capacitance for a given pressure relative to maximum capacitance, be undesirably restricted to preclude the possibility of operation beyond the permitted ratio, since in production it was not practical to individually adjust each pressure transducer sensor oscillator circuit to accommodate the sensitivity of the particular pressure sensing capacitor in that unit. As a result, a number of otherwise satisfactory pressure sensing capacitor elements were rejected as having sensitivities falling outside of the permitted range. The wider permissible operating range of the illustrated frequency comparator 40 of the present invention significantly reduces the number of capacitive pressure sensing elements thus rejected, thereby achieving a significant savings in manufacturing cost.

The variable duty cycle signal developed at the output of EXCLUSIVE OR gate 45 is coupled through a first series resistor 60 to a first integrating capacitor 61, and then through a second series resistor 62 to a second integrating capacitor 63. Resistors 60 and 62 and capacitors 61 and 63 together form an integrating network which transforms the variable duty cycle signal at the output of combining circuit 40 into an analog differential signal at the non-inverting input of an operational amplifier 64.

In accordance with conventional practice, operational amplifier 64 has a degenerative feedback circuit comprising a resistor 65 and a capacitor 66 connected in parallel between the output of the amplifier and the inverting input of the amplifier. The elements 65 and 66 determine the AC and DC gain of operational amplifier 64 by reason of the negative feedback they provide.

An offset bias is provided to the inverting input of operational amplifier 64 by a voltage divider comprising a pair of resistors 67 and 68 connected between a source of unidirectional current and ground. The juncture of these resistors is connected to the inverting terminal of the amplifier through a resistor 69 such that a DC bias level is established in the amplifier in a manner well known to the art. It should be noted that similar bias circuitry, although not shown, is provided for the components of oscillator circuits 20 and 30 and combining circuit 40.

Differential amplifier 64 functions as an output circuit in electronic pressure transducer 10 to provide an analog output signal $V_o$ indicative of sensed pressure. For optimum engine control efficiency, it is desirable that the output voltage $V_o$ vary as a linear function of the sensed pressure so that the engine control computer can accurately set engine parameters such as fuel flow, mixture and timing. Furthermore, it is desirable that this linear relationship be maintained over the entire range of encountered pressures, which may extend over a wide range in the course of normal operaton of the engine. The problem is compounded when, in integrated form, the output of operational amplifier 64 is restricted to a relatively low supply voltage range of 0-5 volts.

Figure 5:
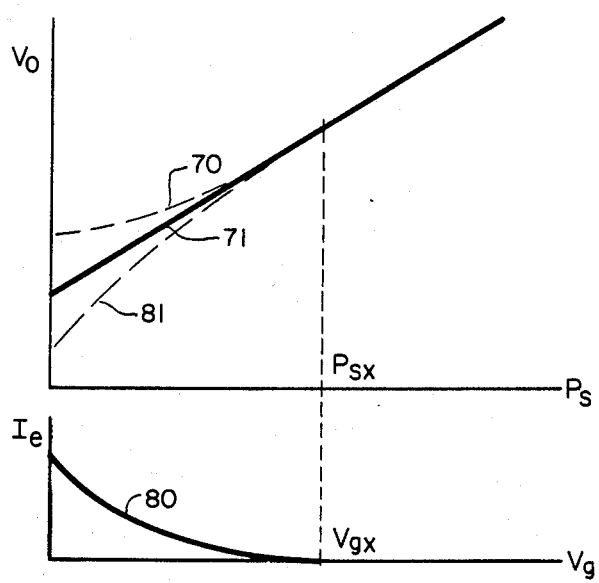
FIG. 5 is a plot of transducer output voltage relative to applied pressure illustrating the function of the linearizing circuit incorporated therein.

Unfortunately, in practice the output of $V_o$ is not linear over the entire pressure range, instead exhibiting a rising characteristic at low sensed pressures. This is illustrated in FIG. 5, where a plot 70 illustrates a hypothetical non-linearized output voltage $V_o$ as a function of sensed pressure $P_s$. There, it is seen that for lower sensed pressures up to a pressure $P_{sx}$ the output $V_o$ is not linear, but is in fact higher than the ideal linear output 71 because of non-linearity introduced by the integrating network. Above the pressure $P_{sx}$ the response of amplifier 64 is substantially linear. Uncorrected, this non-linearity would result in the application of erroneous signals to the engine computer at low manifold pressures, resulting in less than optimum engine control.

To improve linearity, the electronic pressure transducer 10 includes, in accordance with another aspect of the invention, a compensating circuit 72. As shown in FIG. 2, the compensating circuit 72 includes an NPN-type linearity compensating transistor 73 connected through a resistor 74 to a connection 75 in the degenerative feedback circuit of operational amplifier 64. The collector electrode of transistor 73 is connected to a source of unidirectional current, thereby establishing through the principal electrodes of the transistor a variable impedance circuit between connection 75 and the transducer current source. The base or control electrode of transistor 73 is maintained at a positive potential $V_t$ by a resistor 76 connected between the current source and the base electrode, and the principal electrodes of a PNP-type temperature compensating transistor 77. Transistor 77 is biased by a voltage divider comprising resistors 78 and 79.

Thus connected, transistor 73 provides a shunt current path for the feedback circuit of operational amplifier 64. The conduction level through this shunt path is dependent on the conduction level of transistor 73, which in turn is dependent on the base emitter voltage at the transistor and the feedback circuit voltage $V_g$ at connection 75. In this arrangement, for a constant applied base voltage $V_t$, the base emitter junction of transistor 73 serves as a non-linear circuit element such that the current $I_e$ through the junction varies as a function of the applied voltage in the manner of a diode, as shown by the plot 80 of emitter current $I_e$ versus feedback circuit voltage $V_g$. By adjusting the voltage on the base electrode of transistor 73 such that conduction through the junction falls to substantially zero as a voltage $V_{gx}$ is reached corresponding to the pressure $P_{sx}$ at which the response of the transducer output voltage $V_o$ is substantially linear, the non-linear diode-like characteristic of transistor 73 is, in accordance with the invention, made to cause a reduction in the transfer characteristic of operational amplifier 64 in accordance with the theoretical plot 81 in FIG. 5. This reduction in gain in operational amplifier 64, as a consequence of the shunting effect of transistor 73 on the feedback circuit of operational amplifier 64 at the lower signal levels reducing the effective gain of the operational amplifier, achieves the desired linear output voltage $V_o$ characteristic 71 shown in FIG. 5.

In further accord with the invention, changes in conductivity of NPN transistor 73 brought about by temperature changes are automatically compensated for by the reverse temperature characteristic of the opposite gender PNP transistor 77. That is, by reason of the opposite genders of the two transistors, increased conductivity in transistor 73 with increased operating temperature is accompanied by a corresponding decreased conductivity in transistor 77. Since resistors 78 and 79 do not change resistance with temperature, a decrease in conductivity in transistor 77 results in a higher base voltage on transistor 73, which counteracts the otherwise higher conductivity brought about by increased temperature in that transistor. For optimum temperature compensation it is necessary that the temperature characteristics of the two transistors be matched.

The operation of the linearizing circuit 72 can be analyzed by considering the analog control voltage at terminal 75 as causing the diode emitter-base junction of transistor 73 to implement a non-linear resistance due to the biasing of the diode by the feedback circuit voltage. This non-linear diode resistance effects the amount of signal fed back via resistor 65 to the inverting input of operational amplifier 64 and therefore implements a non-linear control of the transfer characteristic of the amplifier as a function of sensed pressure.

By selection of the component values for the elements illustrated in FIG. 2 a substantial improvement in linearity can be achieved over a wide range of sensed pressures even for a narrow zero to 5 volt output voltage range for $V_o$. In practice, a substantially linear output can be achieved for sensed pressures of 20 to 100 kilopascals.

Performance of the compensating circuit can be optimized by selection of appropriate components. For example, resistors 67 and 68 are selected to obtain a desired offset voltage at the output of amplifier 64. Resistors 65 and 69 are selected to set a nominal transfer characteristic or gain for amplifier 64. Resistor 76 is selected to establish the operating point $V_{gx}$ at which transistor 73 ceases to conduct, thereby providing optimum linearization of the output signal. Resistors 78 and 79 are selected to set the conduction level of transistor 77 in accordance with known engineering practices. Transistors 73 and 77 are selected of opposite gender and of complementary characteristics such that temperature changes in one transistor are offset by temperature changes in the other.

Figure 6:
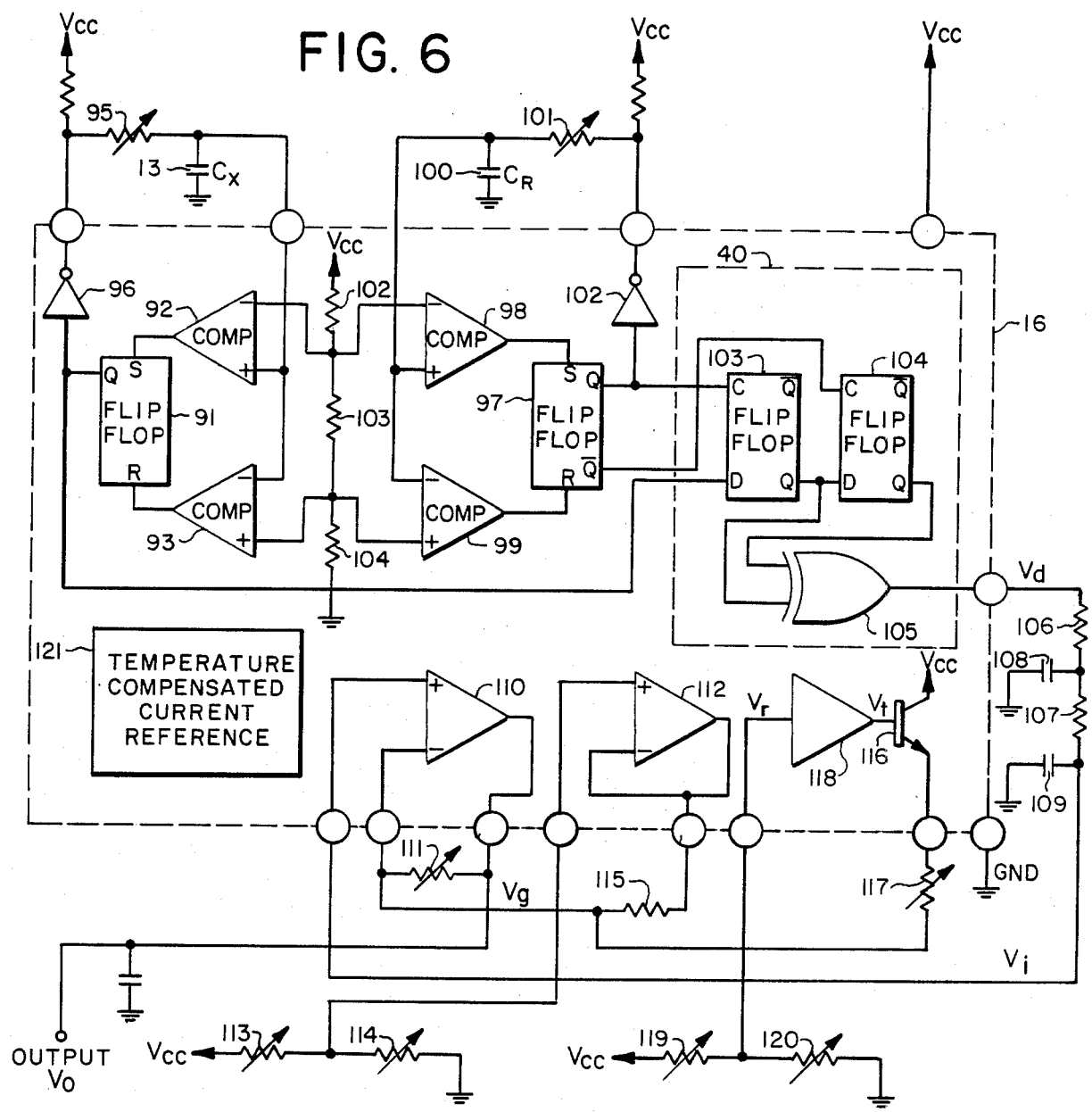
FIG. 6 is a simplified schematic diagram of an integrated-circuit embodiment of the electronic pressure transducer of the invention.

Referring to FIG. 6, the electronic pressure transducer circuit of the invention can be readily implemented in integrated circuit form. In forming the circuit as the integrated circuit chip 16 it is contemplated that the pressure sensor oscillator 20 would in accordance with accepted and known engineering techniques for such construction be implemented utilizing a flip-flop 91 and a pair of comparators 92 and 93. The pressure sensing capacitor 13 controls sensor oscillator frequency in conjunction with a variable resistor 95 provided for adjustment.

Similarly, the reference oscillator 30 is implemented in the form of a flip-flop 97 and a pair of comparators 98 and 99. Reference frequency is controlled by a capacitor 100 external to chip 16 and a variable resistor 101. A voltage divider comprising resistors 102, 103 and 104 provides operating voltages for the oscillator comparators.

The combining stage 40 can be implemented utilizing a pair of flip-flops 103 and 104 and an EXCLUSIVE OR gate 105. The non-inverted Q output of the reference oscillator flip-flop 97 is connected directly to the clock input of flip flop 103. The need for an inverter between the output of the reference oscillator and flip-flop 104 is avoided by connecting the clock input of flip-flop 104 to the inverted $\overline{Q}$ output of flip-flop 97. By connecting the Q output of the pressure sensor oscillator flip-flop 91 directly to the data input of flip-flop 103 the need for an inverter amplifier is avoided. An integrating network comprising resistors 106 and 107 and capacitors 108 and 109 is provided external to the integrated circuit chip 16. The output of the integrator network 106–109 is applied to the non-inverting input of an operational amplifier 110, which serves in the manner of operational amplifier 64 in FIG. 2 to develop an output signal $V_0$. A degenerative feedback circuit for this amplifier is provided in the form of an adjustable resistor 111 external to the chip. An offset voltage is introduced in this feedback circuit by an operational amplifier 112 having its non-inverting input connected to a voltage divider comprising resistors 113 and 114, which establish the offset level, and its output connected to the feedback circuit by a resistor 115.

Linearity compensation is achieved by an NPN-type transistor 116 having its emitter electrode connected through an external resistor 117 to the feedback circuit of amplifier 110. Transistor 116 operates in the manner of linearity compensation transistor 73 in FIG. 2, providing a varying impedance shunt to the feedback network of output amplifier 110. The voltage $V_t$ is established at the base electrode of transistor 116 by an operational amplifier 118 having a reference voltage $V_r$ applied to its input terminal by means of a voltage divider comprising a pair of resistors 119 and 120. By adjustment of resistors 119 and 120 and resistor 117 an operating point for transistor 116 is established such that the transistor serves to linearize the output voltage $V_o$ as a function of sensed pressure.

It will be appreciated that within the integrated circuit 16 various additional circuits and components would be provided in accordance with conventional practice. For example, it is contemplated that a temperature compensated current reference circuit 121 would be incorporated in the chip, and that various power distribution, filtering and bias circuits would be provided. These are not shown in FIG. 6 for reasons of clarity.

Figure 7:
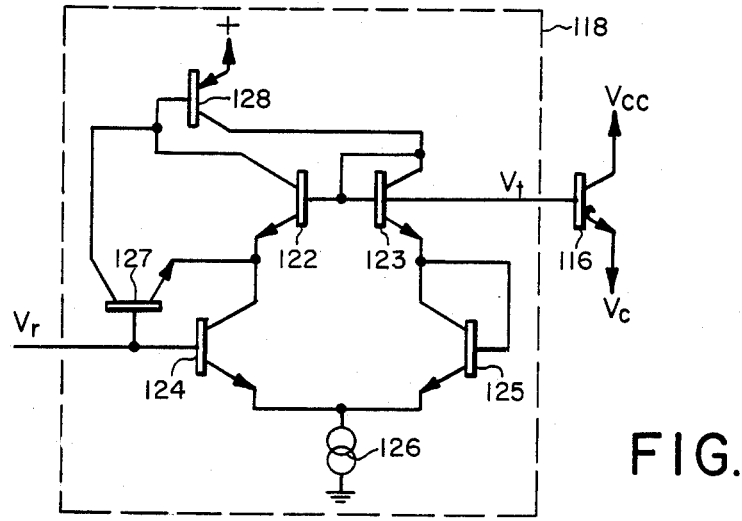
FIG. 7 is a simplified schematic circuit of the temperature-compensating amplifier incorporated in the integrated circuit of FIG. 6.

In implementing the temperature-compensating operational amplifier 118 it is contemplated that in accordance with conventional integrated circuit techniques a circuit consisting of complementary pairs of transistors would in fact be provided on chip 16. As shown in FIG. 7, such a complementary pair circuit may take the form of four NPN-type transistors 122, 123, 124 and 125 connected to ground through a constant current source 126. An NPN transistor 127 and a PNP transistor 128 provide for application of the reference signal $V_r$ to the complementary pair circuit, which functions in a manner well known to the art to amplify and apply the control signal to transistor 116.

Thus, an electronic capacitive pressure transducer processing circuit has been described which can be utilized in conjunction with capacitive pressure transducer elements over an increased range of transducer element sensitivities. This results in a significant reduction in manufacturing cost, since ceramic type sensing elements typically have a range of sensitivities of from 20% to 30% of full scale. With prior art circuits, wherein the range of reference frequency to sensor frequency extended only from 1.5 to 2, the maximum allowable sensitivity was 25% and sensors in the normally encountered range of 25–30% were excluded. In practice, this resulted in either an unacceptably high rejection rate, or the necessity of providing an active trim resistor which had to be individually adjusted in each sensor to accommodate the particular capacitive pressure sensor element incorporated therein. In contrast, with the invention sensor elements having sensitivities of up to 50% can be accommodated. Thus, the entire 25–30% range is acceptable and no active trim is required. Consequently, the yield of sensor elements is increased and the imposition of additional manufacturing costs associated with active trimming of the sensors is avoided.

The pressure sensor of the present invention provides improved linearity and temperature compensation while reducing manufacturing cost. A single temperature-compensated linearity compensating circuit provides for optimum compensation of the sensor output amplifier with a minimal number of additional components.

While particular embodiments of the invention have been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. An electronic pressure transducer for providing a pressure-indicative output signal indicative of an applied pressure, comprising:
    a reference oscillator providing a reference signal having a frequency independent of the applied pressure;
    a sensor oscillator providing a pressure signal having a frequency dependent on the applied pressure;
    combining means for providing a difference signal having a duty cycle related to the frequency difference between said reference signal and said pressure signal over a relative frequency range of 2:1 to 1:1; and
    integrating circuit means responsive to said duty cycle for providing the pressure-indicative output signal.

2. An electronic pressure transducer as defined in claim 1 wherein said sensor oscillator includes a capacitive pressure sensor responsive to the applied pressure.

3. An electronic pressure transducer as defined in claim 1 wherein of said reference oscillator and said sensor oscillator have substantially identical temperature coefficients.

4. An electronic pressure transducer as defined in claim 1 wherein said combining means comprise said first and second flip-flop logic elements and a combining logic element, said first flip-flop being conditioned to one state by said reference signal, and to its other state by said sensor oscillator, said second flip-flop being conditioned to one state by said reference oscillator in alteration with said first flip-flop, and to its other state by said first flip-flop, and said combining logic element being responsive to said first and second flip-flops for producing said variable duty cycle difference signal.

5. An electronic pressure transducer as defined in claim 4 wherein said flip-flops are D-type flip flops each having clock and data inputs and Q and $\overline{Q}$ outputs, the clock input of said first flip-flop being connected to said reference oscillator, the data input of said first flip-flop being connected to said sensor oscillator, the clock input of said second flip-flop being connected through an inverter to said reference oscillator, the data input of said second flip-flop being connected to the Q output of said first flip-flop, and said combining logic element has one input connected to one output of said first flip-flop, and one input connected to one output of said second flip-flop.

6. An electronic pressure transducer as defined in claim 5 wherein said combining logic element comprises an EXCLUSIVE OR gate.

7. An electronic pressure transducer as defined in claim 6 wherein the inputs of said EXCLUSIVE OR gate are connected to respective Q outputs of said first and second flip-flops.

8. An electronic pressure transducer for providing a pressure-indicative output signal indicative of an applied pressure, comprising:
    a reference oscillator providing a reference signal having a frequency independent of the applied pressure;
    a sensor oscillator providing a pressure signal having a frequency dependent on the applied pressure;
    combining means comprising first and second flip-flop logic elements and a combining logic element having first and second inputs, said first flip-flop being conditioned to one state by said reference oscillator signal, and to its other state by said oscillator signal, said second flip-flop being conditioned to one state by said reference oscillator signal in alteration with said flip-flop, and to its other state by said first flip-flop, said first input of said combining logic element being connected to the output of said first flip-flop, said second input of said combining logic element being connected to the output of said second flip-flop, for providing at the output of said combining means a difference signal having a duty cycle dependent on the frequency difference between said sensor and said reference signals; and
    integrating circuit means responsive to said duty cycle for providing the pressure-indicative output signal.

9. An electronic pressure transducer as defined in claim 8 wherein said flip-flops are D-type flip-flops each having clock and data inputs and Q and $\overline{Q}$ outputs, the clock input of said first flip-flop being connected to said reference oscillator, the data input of said first flip-flop being connected to said sensor oscillator, the clock input of said second flip-flop being connected through an inverter to said reference oscillator, the data input of said second flip-flop being connected to the Q output of said first flip-flop, and said combining logic element has one input connected to one output of said first flip-flop, and one input connected to one output of said second flip-flop.

10. An electronic pressure transducer as defined in claim 9 wherein said combining logic element comprises an EXCLUSIVE OR gate.

11. An electronic pressure transducer as defined in claim 8 wherein said sensor oscillator includes a capacitive pressure sensor responsive to the applied pressure.

12. An electronic pressure transducer as defined in claim 8 wherein said reference oscillator and said sensor oscillator have substantially identical temperature coefficients.

13. An electronic pressure transducer for providing a pressure-indicative output signal indicative of an applied pressure, comprising:
a reference oscillator providing a reference signal having a frequency independent of the applied pressure;
a sensor oscillator providing a pressure signal having a frequency dependent on the applied pressure;
combining means comprising first and second D-type flip-flop logic elements each having clock and data inputs and Q and $\overline{Q}$ outputs, an inverter, and a combining logic OR element having first and second inputs, the output of one of said oscillators being applied to the clock input of said first flip-flop, the output of the other of said oscillators being applied to the data input of said first flip-flop, the output of said one of said oscillators being applied through said inverter to the clock input of said second flip-flop, the Q output of said first flip-flop being applied to the data input of said second flip-flop, and said inputs of said logic OR element being connected to respective elements of said flip-flops, for providng at the output of said combining means a difference signal having a duty cycle dependent on the frequency difference between said sensor and reference signals; and
integrating circuit means responsive to said duty cycle for providing the pressure-indicative output cycle signal.

14. An electronic pressure transducer as defined in claim 13 wherein said one oscillator comprises said reference oscillator, and said other oscillator comprises said pressure sensor oscillator.

15. An electronic pressure transducer as defined in claim 13 wherein said combining logic element comprises an EXCLUSIVE OR gate.

16. An electronic pressure transducer as defined in claim 15 wherein the inputs of said EXCLUSIVE OR gate are connected to respective Q outputs of said first and second flip-flops.

17. An electronic pressure transducer as defined in claim 13 wherein said sensor oscillator includes a capacitive pressure sensor responsive to the applied pressure.

18. An electronic pressure transducer as defined in claim 13 wherein the output frequencies of said reference oscillator and said sensor oscillator have substantially identical temperature response characteristics.

19. A linearized electronic pressure transducer for providing a pressure-indicative output signal indicative of an applied pressure, comprising:
pressure sensing circuit means for providing an analog pressure signal having a magnitude varying as a predetermined function of sensed pressure, said pressure signal having an undesirable non-linear variation relative to sensed pressure;
output circuit means coupled to said pressure sensing means and responsive to said analog signal for producing an analog output signal, said output circuit means having a transfer characteristic dependent on an applied control signal; and
compensating circuit means responsive to said output signal for varying the transfer characteristic of said circuit means to compensate for said non-linear characteristic in said pressure signal whereby said output signal is linearly indicative of the applied pressure, wherein said output circuit comprises an amplifier having a degenerative feedback circuit, and said compensating circuit means are coupled to said feedback circuit, and wherein said compensating means comprise a transistor having principal electrodes connected between said feedback circuit and a plane of reference potential, and wherein a control electrode of said transistor is connected to a control potential.

20. A linearized electronic pressure transducer as defined in claim 19 wherein said transducer is operable over a predetermined temperature range, said transistor is subject to variations in conduction level with changes in temperature, and said linearity compensating circuit means include temperature compensating means coupled to the control electrode of said transistor for applying a control signal to said transistor to maintain the conduction level of said transistor constant with variations in temperature.

21. A linearized electronic pressure transducer as defined in claim 20 wherein said temperature compensating means comprise a temperature compensating transistor having principal electrodes coupled between said control electrode of said linearity compensating transistor and said plane of reference potential.

22. A linearized electronic pressure transducer as defined in claim 21 wherein said linearity compensating transistor is of one gender, and said temperature compensating transistor is of the opposite gender.

23. A linearized electronic pressure transducer as defined in claim 22 wherein said linearity transducer is an NPN transistor, and said temperature compensating transistor is a PNP transistor.

24. A linearized electronic pressure transducer for providing a pressure-indicative output signal indicative of an applied pressure, comprising:
pressure sensing circuit means for providing an analog pressure signal having a magnitude varying as a predetermined function of sensed pressure, said pressure signal having an undesirable non-linear variation relative to sensed pressure;
output circuit means coupled to said pressure sensing means and responsive to said analog signal for producing an analog output signal, said output circuit means having a transfer characteristic dependent on an applied control signal; and
compensating circuit means responsive to said output signal for varying the transfer characteristic of said circuit means to compensate for said non-linear characteristic in said pressure signal whereby said output signal is linearly indicative of the applied pressure,
wherein said output circuit comprises an amplifier and said compensating circuit means are coupled to said amplifier and wherein said compensating means comprise a transistor having principal electrodes, at least one of which being connected to said amplifier output signal, and wherein a control electrode of said transistor is connected to a control potential.

25. A linearized electronic pressure transducer as defined in claim 24 wherein said transducer is operable over a predetermined temperature range, said transistor is subject to variations in conduction level with changes in temperature, and said linearity compensating circuit means include temperature compensating means coupled to the control electrode of said transistor for applying a control signal to said transistor to maintain the conduction level of said transistor constant with variations in temperature.

26. A linearized electronic pressure transducer as defined in claim 25 wherein said temperature compensating means comprise a temperature compensating transistor having principal electrodes coupled between said control electrode of said linearity compensating transistor and one of said principal electrodes of said linearity compensating transistor.

27. A linearized electronic pressure transducer as defined in claim 24 wherein said transistor principal electrodes are connected between said amplifier output signal and a plane of reference potential.

* * * * *